United States Patent [19]
Peng

[11] Patent Number: 5,387,786
[45] Date of Patent: Feb. 7, 1995

[54] FOCUSSING DEVICE FOR A BAR CODE READER

[75] Inventor: Ke-Ou Peng, KV Delft, Netherlands

[73] Assignee: Opticon Sensors Europe B.V., Netherlands

[21] Appl. No.: 882,442

[22] Filed: May 12, 1992

[30] Foreign Application Priority Data

May 13, 1991 [EP] European Pat. Off. ......... 912011153

[51] Int. Cl.6 .............................................. G06K 7/10
[52] U.S. Cl. ...................................................... 235/462
[58] Field of Search ................ 235/462; 359/824, 826, 359/202

[56] References Cited

U.S. PATENT DOCUMENTS

| | | | |
|---|---|---|---|
| 4,136,821 | 1/1979 | Sugiura | 235/462 |
| 4,161,756 | 7/1979 | Thomas | 359/824 |
| 4,639,084 | 1/1987 | Kugioka | 359/824 |
| 4,679,905 | 7/1987 | Westover | 350/255 |
| 4,763,987 | 8/1988 | Ando | 359/826 |
| 4,820,911 | 4/1989 | Arackellian | 235/472 |
| 4,877,949 | 10/1989 | Danielson | 235/462 |
| 4,905,031 | 2/1990 | Mody | 359/824 |
| 4,920,255 | 4/1990 | Gabeler | 235/454 |
| 5,029,992 | 7/1991 | Richardson | 359/824 |
| 5,067,794 | 11/1991 | Marx | 359/824 |
| 5,078,472 | 1/1992 | Sugawara | 359/824 |
| 5,122,644 | 6/1992 | Hasegawa | 235/470 |
| 5,138,497 | 8/1992 | Blanding | 359/824 |
| 5,192,856 | 3/1993 | Schaham | 235/462 |

FOREIGN PATENT DOCUMENTS

| | | | |
|---|---|---|---|
| 0091112 | 10/1983 | European Pat. Off. . | |
| 2251876 | 6/1975 | France . | |
| 259929A | 9/1988 | Germany | 359/824 |
| 3736288 | 5/1989 | Germany . | |
| 58-31872 | 3/1983 | Japan | 359/824 |
| 58-89782 | 5/1983 | Japan | 359/824 |
| 2146900 | 6/1990 | Japan | 359/826 |
| 8400228 | 1/1984 | WIPO . | |

Primary Examiner—Davis L. Willis
Assistant Examiner—Karl D. Frech
Attorney, Agent, or Firm—Parmelee, Bollinger & Bramblett

[57] ABSTRACT

A focussing device for a bar code reader comprises a lens system and a drive therefor. The lens system comprises at least one lens or set of lenses moveable in the direction of its optical axis. The drive comprises at least one coil and a magnetic element, wherein at least one moveable lens or set of lenses is fixed to the magnetic element and the magnetic element is a magnetic ring slideably arranged in a holding element, and wherein said at least one coil is fixed relative to the holding element. The lens system may comprise at least two fixed lenses or sets of lenses, at least one moveable lens or set of lenses being arranged between two fixed lenses or sets of lenses. A gating device selectively passes signals output by a sensor that senses light scattered by a bar code passing through the focussing device.

5 Claims, 2 Drawing Sheets

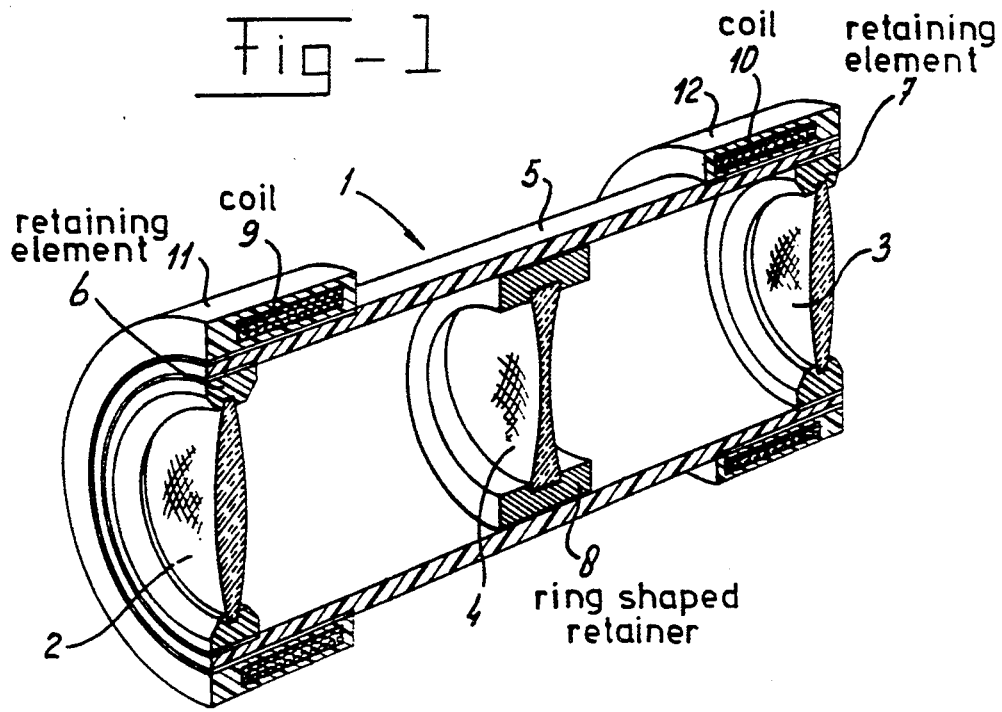
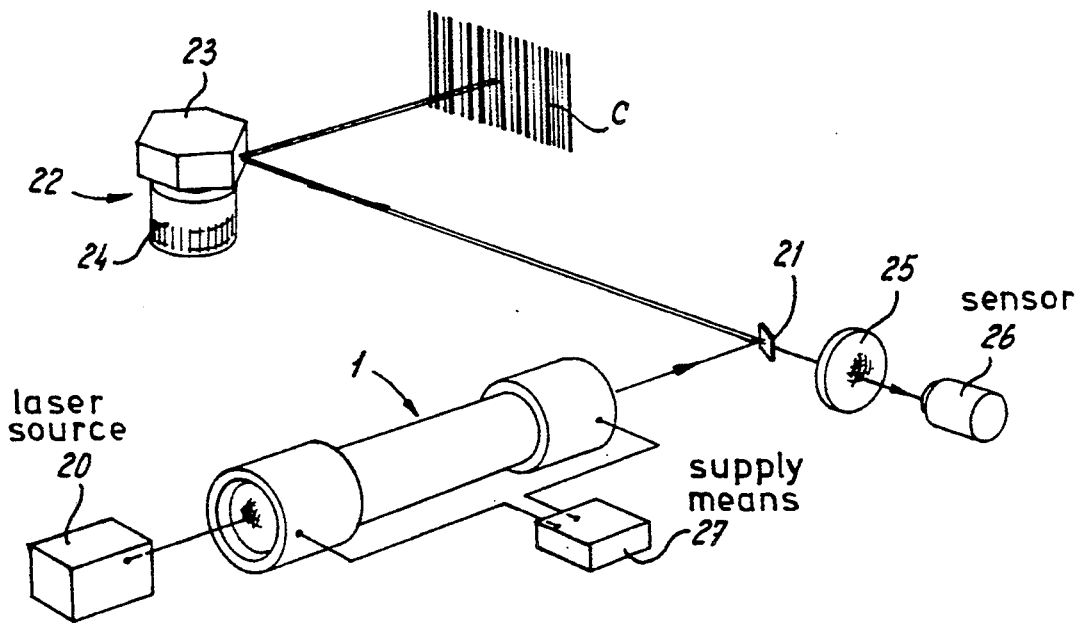

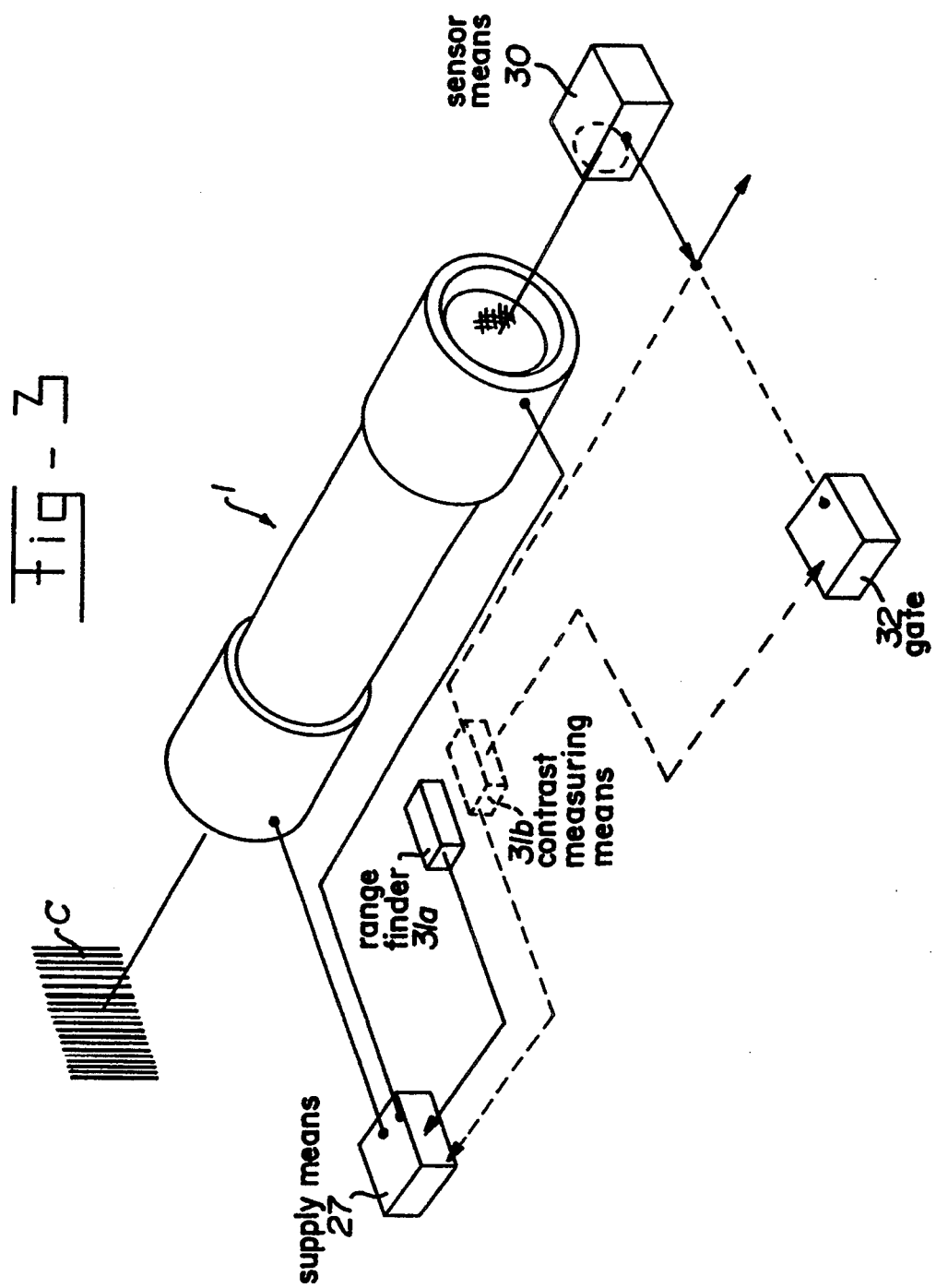

FOCUSSING DEVICE FOR A BAR CODE READER

BACKGROUND OF THE INVENTION

The present invention relates to focussing means for a bar code reader, comprising a lens system and drive means, the lens system comprising at least one lens or set of lenses moveable in the direction of its optical axis, the drive means comprising at least one coil and a magnetic element. The invention further relates to a bar code reader comprising such focussing means.

A bar code reader comprising such focussing means is disclosed in the German patent application DE-A-3,736,288.

Bar code readers generally comprise focussing means, such as a lens system, for focussing light scattered by a bar code onto a sensor or an array of sensors. Most known focussing means have the disadvantage that the focussing is highly dependent on the distance of the bar code relative to the reader. If the distance between the bar code and the reader is changed, the image of the bar code on the sensor is out of focus, resulting in a decreased likelihood that the code is read correctly. If the distance is changed even further, the reader may not be able to read the code at all.

Several arrangements have been proposed for providing focussing means having an extended working range, i.e. an extended range of distances in which the image of the bar code on the sensor (or an array of sensor elements) is substantially in focus. One such arrangement contains holographic elements positioned on a rotating wheel, each element having a different focal length. The variation in focal length is for this arrangement necessarily discontinuous.

The focussing means disclosed in the above-mentioned German patent application comprise drive means for varying the position of a moveable lens. These known drive means are constituted by a fixed permanent magnet and a moveable coil. The moveable lens is mounted in the moveable coil, while the coil is loosely and only partially inserted in the substantially annular permanent magnet. The moveable coil is connected to a control unit by means of coils leads.

The bar code reader disclosed in the said German patent application is designed for reading very small bar codes which are applied on semiconductor surfaces by means of dots having a diameter of approximately 15 μm. Such semiconductor surfaces are generally precisely positioned relative to the bar code reader. The range of focussing distances of this known device is necessarily very small. The known focussing means therefore only allow a movement of the lens of typically ±1 mm. Such a small movement of the lens is however insufficient for most applications where e.g. bar codes applied on consumer articles have to be read. A typical point of sale bar code reader has to be able to correctly read bar codes at distances varying from a few to several dozens of centimeters. The above-mentioned known bar code reader does not allow such a reading range. Furthermore, the known bar code reader cannot easily be adapted to allow an expanded movement of the lens. The known structure, in which the relatively small movement is primarily limited by electromagnetic forces, is not suited for guiding the moveable part over a relatively large range of travel.

SUMMARY OF THE INVENTION

The object of the present invention is therefore to provide focussing means having a large and preferably continuously variable working range. The focussing means according to the invention are therefore characterized in that the at least one moveable lens or set of lenses is fixed to the magnetic element, the magnetic element being slideably arranged in a holding element, and in that the at least one coil is fixed relative to the holding element. By providing a holding element for slideably fitting and therefore guiding the magnetic element in which the moveable lens is arranged, a large range of travel of the lens and therefore a large working range of the bar code reader is obtained.

As the lens is moved in the direction of its optical axis, the focal length can be changed continuously. The focussing means according to the invention are therefore very flexible due to the possibility of continuously changing the focal length using one or at least one moveable lens. The drive means according to the invention make a very swift movement of the moveable lens possible, while containing a minimal amount of moving parts.

In order to provide a wide range of travel of the moveable lens or set of lenses, the coils are preferably arranged on the exterior of the holding element in the vicinity of each end.

For some applications it is sufficient for the focussing means to have a single moveable lens. For other applications, such as a bar code reader having a CCD-array, a multiple lens set may be necessary because of, for instance, white light aberrations. Instead of a single moveable lens, a moveable set of lenses can be used.

The moveable lens or set of lenses can be combined with one or more fixed lenses. A preferred embodiment of the focussing means according to the invention is designed in such a way, that the lens system comprises at least two fixed lenses or sets of lenses, at least one moveable lens or set of lenses being arranged between two fixed lenses or sets of lenses. This offers the advantage that the focussing means have a fixed length, while a focal length can be varied by travel of the moveable lens between the fixed lenses.

Preferably at least one moveable lens and at least two fixed lenses are contained in a substantially tubular holding element, the fixed lenses being mounted in the holding element, in the vicinity of its ends. This makes a very compact structure of the inventive focussing means possible.

The magnetic element may comprise a ferromagnetic ring slidably fitting in the tubular holding element. The moveable lens can be mounted in such a ring, providing a compact and rugged structure.

A bar code reader comprising focussing means according to the invention comprises supply means for supplying an excitation current to the drive means. The supply means can be arranged for supplying a periodical excitation current, thus producing a periodical movement of the moveable lens or set of lenses. According to the invention it is also possible that the supply means are arranged for varying the excitation current in response to a control signal. The control signal can be produced by an optical and/or ultrasonic range finder. In this way the focussing means are adapted to the distance between the bar code and the bar code reader. Alternatively, the control signal can be produced by contrast measuring means, thus ensuring the correct focussing of the focussing means.

In a bar code reader having a laser source for producing a laser beam, the focussing means according to the invention can be used for focussing the laser beam. Such a bar code reader can be provided with optical scanning means for scanning a bar code, i.e. for passing the laser beam across the code. According to the invention, such optical scanning means may comprise a rotatable polygon having reflective sides.

A passive bar code reader, e.g. a reader having a CCD-array, may utilize the focussing means according to the invention for focussing light scattered by a bar code on the sensor means. Such a bar code reader may comprise gating means for selectively passing signals output by the sensor means, the passing being dependent on control signals produced by a range finder and/or contrast measuring means. As a result, the signals produced by the sensor means are only passed when the light scattered by a bar code is substantially focussed on the sensor means.

BRIEF DESCRIPTION OF THE DRAWINGS

The invention will be explained in more detail in reference to the accompanying drawings, in which:

FIG. 1 shows in perspective a cross-section of a preferred embodiment of the focussing means according to the invention.

FIG. 2 shows in perspective an active bar code reader comprising focussing means according to the invention.

FIG. 3 shows partially in perspective a passive bar code reader comprising focussing means according to the invention.

DETAILED DESCRIPTION OF THE EMBODIMENTS

The focussing device 1 shown in FIG. 1 comprises two fixed lenses 2 and 3 and a moveable lens 4. The fixed lenses 2 and 3 are mounted in a tubular body 5 by means of retaining elements 6 and 7. The moveable lens 4 is mounted in a ring-shaped retainer 8. The retainer 8, which is preferably made of a magnetizable or (ferro-) magnetic material, is slidably fitted in the tubular body 5. In order to avoid adhesion between the retainer 8 and the body 5, the latter is preferably made of a non-magnetic material. The coils 9 and 10, accommodated in coil holders 11 and 12, are mounted on the exterior of the tubular body 5. As shown in FIG. 1, the coils 9 and 10 are located near the ends of the tubular body 5, i.e. in the vicinity of the fixed lenses 2 and 3 respectively.

In the preferred embodiment of the invention shown in FIG. 1, the lenses 2 and 3 are both positive, single lenses, while the lens 4 is a negative, single lens. It is, however, possible for each lens 2, 3 or 4, to be replaced by a set of lenses of the opposite sign (positive or negative), depending on e.g. the need for aberration correction. For some applications, e.g. for focussing a laser beam, one or both of the fixed lenses 2 and 3 may be omitted altogether.

The focussing means according to the invention, as shown in FIG. 1, have a fixed length, i.e. the length of the tubular body 5. The moveable lens 4 can travel between the fixed lenses 2 and 3, the range of travel being limited in the preferred embodiment by the retaining element 6 and 7 and the retainer 8. This range of travel provides a large variation in the focal length of the focussing means. In fact, a range of travel of approximately 20 mm may provide a focussing range from 50 to 500 mm.

The movement of the moveable lens 4 is provided by drive means, constituted by the coils 9 and 10 in combination with the retainer 8. When the coils 9 and 10 are energized, a magnetic field is created, which acts on the magnetic or magnetizable retainer 8, causing the retainer 8 and the lens 4 to move. Depending on the kind or speed of movement desired, either one or both of the coils 9 and 10 can be energized, using an alternating or a direct current. If the intended range of travel is relatively short, one of the coils 9 or 10 may be omitted. The remaining coil may not be located near one of the ends of the body 5, but for example half-way between the ends.

Preferably the moveable lens 4 is a thin lens having a relatively small mass, the retainer 8 being made as a relatively thin ring. This reduces the inertia of the moving parts of the system, making an almost instantaneous movement of the lens 4 possible. The inertia can be further reduced by employing a moveable lens made of plastic or the like. The embodiment shown in FIG. 1, comprising two fixed lenses (or sets of lenses) and one moveable lens, offers the advantage that the amount of travel required by the moveable lens to obtain a certain change in focal length may generally be smaller than would be required for a device having only one fixed lens (or set of lenses). Furthermore, the overall length of the focussing device does not change. The focussing means according to the invention do therefore provide a compact and fast focussing device, enabling the bar code in a relatively large range of distances to be imaged perfectly with a relatively large aperture.

It is of course possible to provide the focussing device according to the invention with two moveable lenses or sets of lenses, possibly in combination with more than two coils, say three or four coils. This complicates, however, control of the movement of the moveable parts of the device, making more complex excitation current supply means necessary.

In the embodiment shown in FIG. 1, the coils are fixed to the body of the focussing means, while the retainer constituting the magnetic element is moveably arranged in the body. It will be obvious that other embodiments of the focussing means according to the invention are also possible. In one alternative embodiment, the moveable lens is mounted in a coil which is slideably arranged in the body, while one or more magnetic elemens are fixed to the body, thus exchanging the positions of the magnetic element and the coils. In another alternative embodiment, the fixed coils (or fixed magnetic elements) are not mounted on the body, but are spaced apart from it while being held in position by separate mounting means. The body, which holds and guides the moveable element, need not to be tubular but may be e.g. rectangular. Alternatively, the body may be replaced by a set of guiding rods for guiding the movement of the moveable lens.

In FIG. 2, an active bar code reader according to the invention comprises a laser source 20, such as a diode laser, for producing a laser beam. The laser beam is focussed by the focussing means 1, as shown in FIG. 1, and is subsequently reflected by a small mirror 21 towards the scanning means 22. These scanning means 22, which are constituted by a rotatable polygon 23 having reflective sides and a motor 24, reflect the laser beam towards the bar code C. Due to the rotation of the polygon 23, the laser beam passes across the code, resulting in a scanning of the code C by the laser beam. The light scattered by the bar code C is in turn reflected by the polygon 23 in the direction of a lens (or set of lenses) 25 and is focussed by the lens 25 on a sensor 26.

It is obvious from FIG. 2 that the mirror 21 should be small enough to enable the bulk of the reflective light to reach the lens 25. The sensor 26 produces a signal representative of the bar code, which signal is fed to appriopriate processing means (not shown).

The bar code reader according to the invention further comprises supply means 27 for supplying an electrical excitation current to the coils of the focussing means 1. Preferably the supply means 27 provide a periodical excitation current, causing a periodical movement of the moveable lens. This results in a periodical change in the focal length of the bar code reader. In this way, at some point of time the laser beam will be focussed on the bar code C irrespective of the distance of the code to the reader, provided that the code is within the reader's working range.

In FIG. 3, a passive bar code reader according to the invention comprises focussing means 1 for focussing light scattered by a bar code C on the sensor means 30. The sensor means 30 preferably contain an array of CCD-elements (not shown). Supply means 27 supply an excitation current to the coils of the focussing means 1 in order to move the moveable lens (not shown) and thus to change the focal length of the focussing means 1. Preferably the supply means 27 are controlled by control means. The control means may comprise an ultrasonic or optic range finder 31a for measuring the distance between the bar code and the reader in order to adjust the focussing means 1 accordingly. The control means may also comprise contrast measurement means 31b, in which case output signals from the sensor means 30 are fed to the control means. These sensor output signals are used by the contrast measurement means 31b to determine the contrast between the dark and light areas of the bar code as imaged by the focussing means 1 on the photosensitive array of the sensor means 30. The contrast measurement means 31b produce a control signal in response to the measured contrast in order to adjust the focussing means 1.

The control means may also provide a control signal to an optional gate 32 so as to only pass sensor output signals to subsequent signal processing means (not shown) if the bar code is properly imaged on the photosensitive array of the sensor means 30.

Instead of an image or distance dependent focussing control signal, a periodic signal can be used to produce a periodical movement of the moveable lens (or set of lenses). Decoding of the sensor output signals may be performed continuously, the decoding being successful when the bar code is focussed on the sensor array.

It will be understood that other embodiments are possible without departing from the spirit and scope of the present invention.

I claim:

1. Focussing means for a bar code reader, comprising a lens system and drive means, said lens system comprising at least one lens or set of lenses moveable in the direction of its optical axis, said drive means comprising at least one coil and a magnetic element, wherein said magnetic element comprises a magnetic ring slideably fitting in a holding element characterized in that said at least one moveable lens or set of lenses is fixed to said magnetic element, said magnetic element being slideably arranged in said holding element, wherein said holding element is substantially tubular and in that said at least one coil is fixed relative to said holding element.

2. A bar code reader comprising focussing means, the focussing means comprising a lens system and drive means, said lens system comprising at least one lens or set of lenses moveable in the direction of its optical axis, said drive means comprising at least one coil and a magnetic element, wherein said at least one moveable lens or set of lenses is fixed to said magnetic element, said magnetic element being slideably arranged in a holding element, and said at least one coil being fixed relative to said holding element, further comprising supply means for supplying to said drive means an excitation current which varies in response to a control signal, said focussing means being arranged for focussing light scattered by a bar code on sensor means, further comprising gating means for selectively passing signals output by said sensor means, the passing being dependent on control signals produced by a range finder.

3. A bar code reader according to claim 2, wherein said signals produced by said sensor means are only passed when the light scattered by a bar code is substantially focussed on the sensor means.

4. A bar code reader comprising focussing means, the focussing means comprising a lens system and drive means, said lens system comprising at least one lens or set of lenses moveable in the direction of its optical axis, said drive means comprising at least one coil and a magnetic element, wherein said at least one moveable lens or set of lenses is fixed to said magnetic element, said magnetic element being slideably arranged in a holding element, and said at least one coil being fixed relative to said holding element, further comprising supply means for supplying to said drive means an excitation current which varies in response to a control signal, said focussing means being arranged for focussing light scattered by a bar code on sensor means, further comprising gating means for selectively passing signals output by said sensor means, the passing being dependent on control signals produced by contrast measuring means.

5. A bar code reader according to claim 4, wherein said signals produced by said sensor means are only passed when the light scattered by a bar code is substantially focussed on the sensor means.

* * * * *